(12) United States Patent
Lang et al.

(10) Patent No.: US 10,588,270 B2
(45) Date of Patent: Mar. 17, 2020

(54) BALER FEED SYSTEM

(71) Applicant: Deere & Company, Moline, IL (US)

(72) Inventors: Eric R. Lang, Newhall, IA (US); Bart A. Coffman, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 131 days.

(21) Appl. No.: 15/692,882

(22) Filed: Aug. 31, 2017

(65) Prior Publication Data

US 2019/0059230 A1    Feb. 28, 2019

(51) Int. Cl.
| | | |
|---|---|---|
| *A01F 15/10* | (2006.01) | |
| *A01D 89/00* | (2006.01) | |
| *A01F 15/04* | (2006.01) | |
| *B65B 35/50* | (2006.01) | |

(52) U.S. Cl.
CPC ............ *A01F 15/10* (2013.01); *A01D 89/001* (2013.01); *A01F 15/04* (2013.01); *A01F 15/101* (2013.01); *A01F 2015/102* (2013.01); *B65B 35/50* (2013.01)

(58) Field of Classification Search
CPC ....... B65B 35/50; A01D 89/001; A01F 15/04; A01F 15/10; A01F 15/101; A01F 2015/102
See application file for complete search history.

(56) References Cited

U.S. PATENT DOCUMENTS

| | | | |
|---|---|---|---|
| 4,569,282 A * | 2/1986 | Galant | A01F 15/04 100/189 |
| 5,467,702 A | 11/1995 | Naaktgeboren et al. | |
| 5,768,872 A * | 6/1998 | Von Allworden | A01D 90/02 100/189 |
| 6,349,636 B1 | 2/2002 | Hawlas | |

(Continued)

FOREIGN PATENT DOCUMENTS

| | | |
|---|---|---|
| EP | 3001894 A1 | 4/2016 |
| FR | 2863821 A1 | 6/2005 |

(Continued)

OTHER PUBLICATIONS

European Patent Office Extended Search Report for Application No. 18191895.4 dated Feb. 15, 2019 (7 pages).

*Primary Examiner* — Alicia Torres
*Assistant Examiner* — Adam J Behrens
(74) *Attorney, Agent, or Firm* — Michael Best & Friedrich LLP (57) ABSTRACT

A baler including a frame, a compression system coupled to the frame, the compression system at least partially defining a compression chamber, a feed pan at least partially defining a pre-compression chamber, where the pre-compression chamber is in operable communication with the compression chamber, a first driven output shaft rotatable about a first axis of rotation, a second driven output shaft rotatable about a second axis of rotation, a lifting fork movable with respect to the pre-compression chamber and at least partially posi- (Continued)

tionable therein, where rotation of the first driven output shaft, the second driven output shaft, or any combination thereof causes the lifting fork to move with respect to the pre-compression chamber, and where the first driven output shaft is operable independently of the second driven output shaft.

9 Claims, 7 Drawing Sheets

(56) References Cited

U.S. PATENT DOCUMENTS

| | | | |
|---|---|---|---|
| 6,385,952 B1* | 5/2002 | Bergkamp | A01F 15/101 100/189 |
| 8,561,532 B2* | 10/2013 | Bergmann | A01F 15/101 100/179 |
| 9,010,241 B2* | 4/2015 | Naaktgeboren | A01F 15/101 100/142 |
| 9,480,205 B2* | 11/2016 | Naeyaert | A01F 15/101 |
| 9,743,590 B2* | 8/2017 | Rosseel | A01F 15/0841 |
| 10,244,684 B2* | 4/2019 | Devroe | A01F 15/101 |
| 2003/0172640 A1* | 9/2003 | Amstel Van | A01F 15/10 56/341 |
| 2012/0186465 A1 | 7/2012 | Dresher | |
| 2013/0104512 A1* | 5/2013 | Duenwald | A01F 15/101 56/341 |
| 2015/0208586 A1 | 7/2015 | Lang et al. | |
| 2017/0290272 A1 | 10/2017 | Morselli | |

FOREIGN PATENT DOCUMENTS

| | | |
|---|---|---|
| FR | 2882623 A1 | 9/2006 |
| WO | 2013083519 A1 | 6/2013 |

* cited by examiner

BALER FEED SYSTEM

BACKGROUND

Certain present square baler designs utilize a "single fork system" whereby a single loading fork is relied upon to both "pack" the crop material into the pre-compression chamber and "fill," or convey the crop material into the compression chamber for final densification. In such designs, complex locking and release mechanisms must be employed to allow the loading fork to change paths between the packing and filling operations. When used, such mechanisms are typically complex and require regular maintenance to maintain proper timing and functionality. Furthermore, such components are generally exposed outside the gear housings and used in environments that are prone to wear, necessitating the frequency of adjustment.

SUMMARY

In one implementation, a baler including a frame, a compression system coupled to the frame, the compression system at least partially defining a compression chamber, a feed pan at least partially defining a pre-compression chamber, where the pre-compression chamber is in operable communication with the compression chamber, a first driven output shaft rotatable about a first axis of rotation, a second driven output shaft rotatable about a second axis of rotation, a lifting fork movable with respect to the pre-compression chamber and at least partially positionable therein, where rotation of the first driven output shaft, the second driven output shaft, or any combination thereof causes the lifting fork to move with respect to the pre-compression chamber, and where the first driven output shaft is operable independently of the second driven output shaft.

In another implementation, a baler including a frame, a compression system coupled to the frame, the compression system at least partially defining a compression chamber, a feed pan at least partially defining a pre-compression chamber, where the pre-compression chamber is in operable communication with the compression chamber, a lifting fork movable with respect to the pre-compression chamber, a first driven output shaft rotatable about a first axis of rotation and operably coupled to the lifting fork via a first linkage assembly, a second driven output shaft rotatable about a second axis of rotation and operably coupled to the lifting fork via a second linkage assembly, and a controller in operable communication with the first driven output shaft and the second driven output shaft, where the controller is configured to operate in a first mode of operation in which the first driven output shaft is configured to rotate about the first axis of rotation and the second driven output shaft is configured to concurrently not rotate about the second axis of rotation, and a second mode of operation in which the first driven output shaft is configured to rotate about the first axis of rotation and the second driven output shaft is configured to concurrently rotate about the second axis of rotation.

In still another implementation, a baler including a frame, a compression system coupled to the frame, the compression system at least partially defining a compression chamber, a feed pan at least partially defining a pre-compression chamber, where the pre-compression chamber is in operable communication with the compression chamber, a lifting fork movable with respect to the pre-compression chamber along a first lifting path and along a second lifting path different than the first lifting path, a first driven output shaft rotatable about a first axis and operably coupled to the lifting fork via a first linkage assembly, and a second driven output shaft rotatable about a second axis and operably coupled to the lifting fork via a second linkage assembly, where movement of at least one of the first driven output shaft or the second driven output shaft causes the lifting fork to move with respect to the pre-compression chamber such that when the first driven output shaft rotates about the first axis and the second lifting fork concurrently does not rotate about the second axis the lifting fork travels along the first lifting path, and when the first driven output shaft rotates about the first axis and the second lifting fork concurrently rotates about the second axis the lifting fork travels along the second lifting path.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways. Directions such as clockwise and counterclockwise used herein are for illustrative purposes only.

Figure 1:
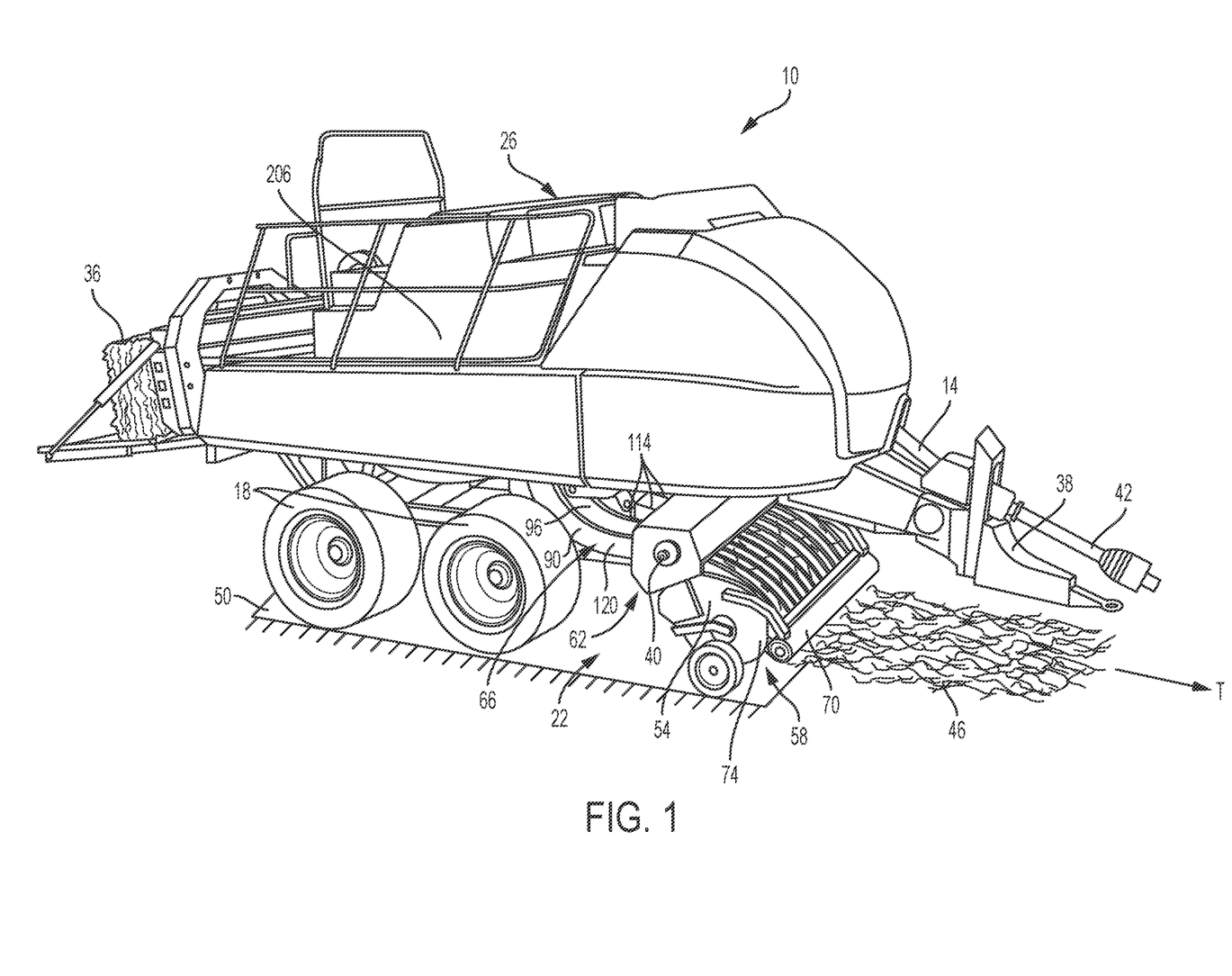
FIG. 1 is a perspective side view of a machine, such as a baler, having a feed system in accordance with one implementation of the present disclosure.
Figure 2A:
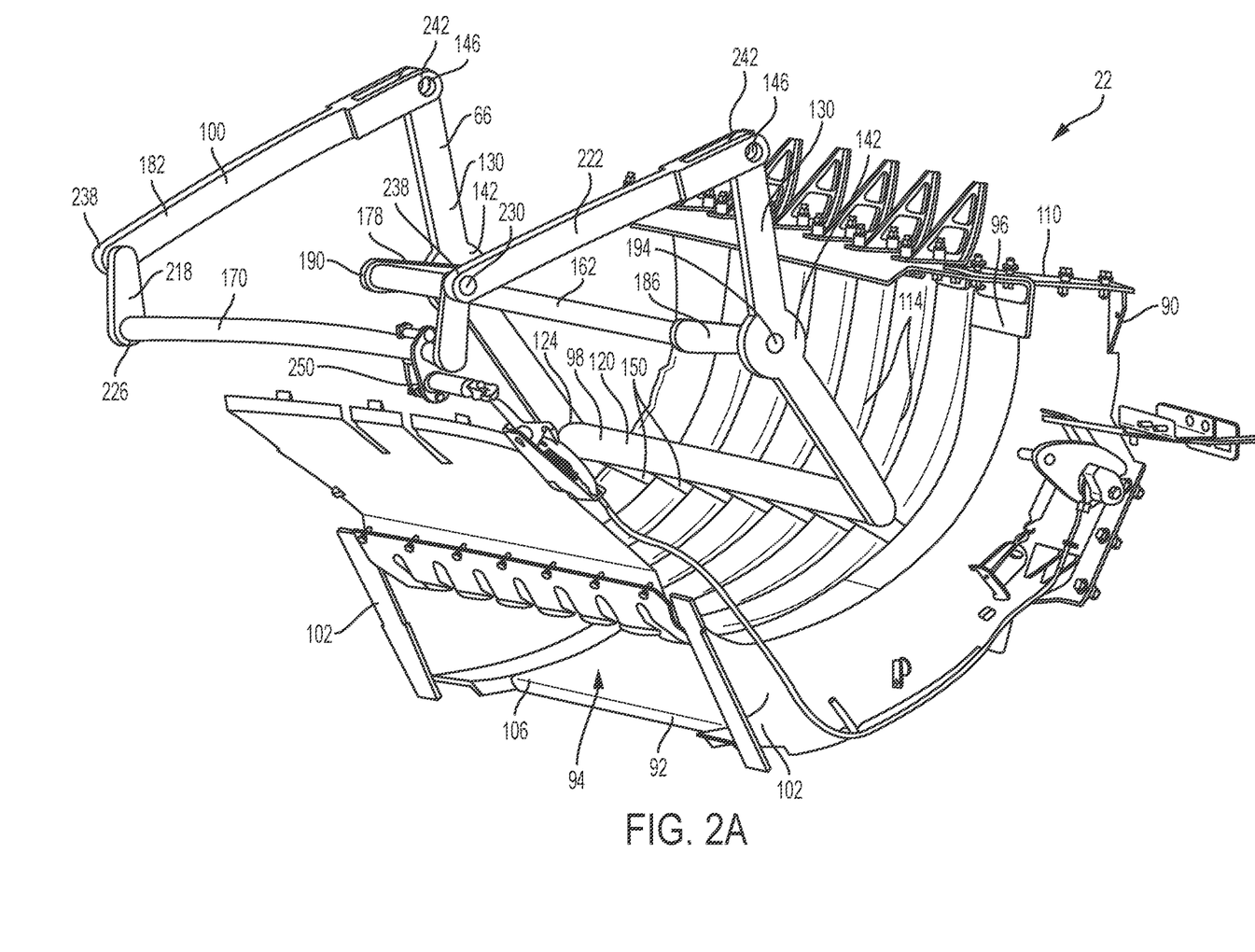
FIG. 2A is a detailed perspective view of the feed system of the baler of FIG. 1.

Referring to FIGS. 1 and 2A, a baler 10 includes a frame 14, a set of wheels 18 mounted on the frame 14, a feed system 22 coupled to the frame 14, and a compression system 26 to receive and compress crop material 46 provided by the feed system 22. The compression system 26, in turn, is a square baler and includes a reciprocating piston (not shown) positioned within a compression chamber 206 able to form bales 36 of a crop, such as hay, straw, or other biomasses.

In the illustrated embodiment, the frame 14 of the baler 10 includes a tow bar 38 extending from the frame 14 and connectable to a towing vehicle (not shown), such as an agricultural tractor or other vehicle. The baler 10 also includes a power takeoff shaft 42 connectable to the towing vehicle to transmit a rotating drive force from the towing vehicle to the various components of the baler 10. In other implementations, the baler 10 may have a dedicated power supply and/or prime mover (not shown), such as an engine, motor, battery, fuel cell, etc., for driving the wheels 18 and for driving and/or powering the various components of the baler 10 (described below).

Figure 2B:
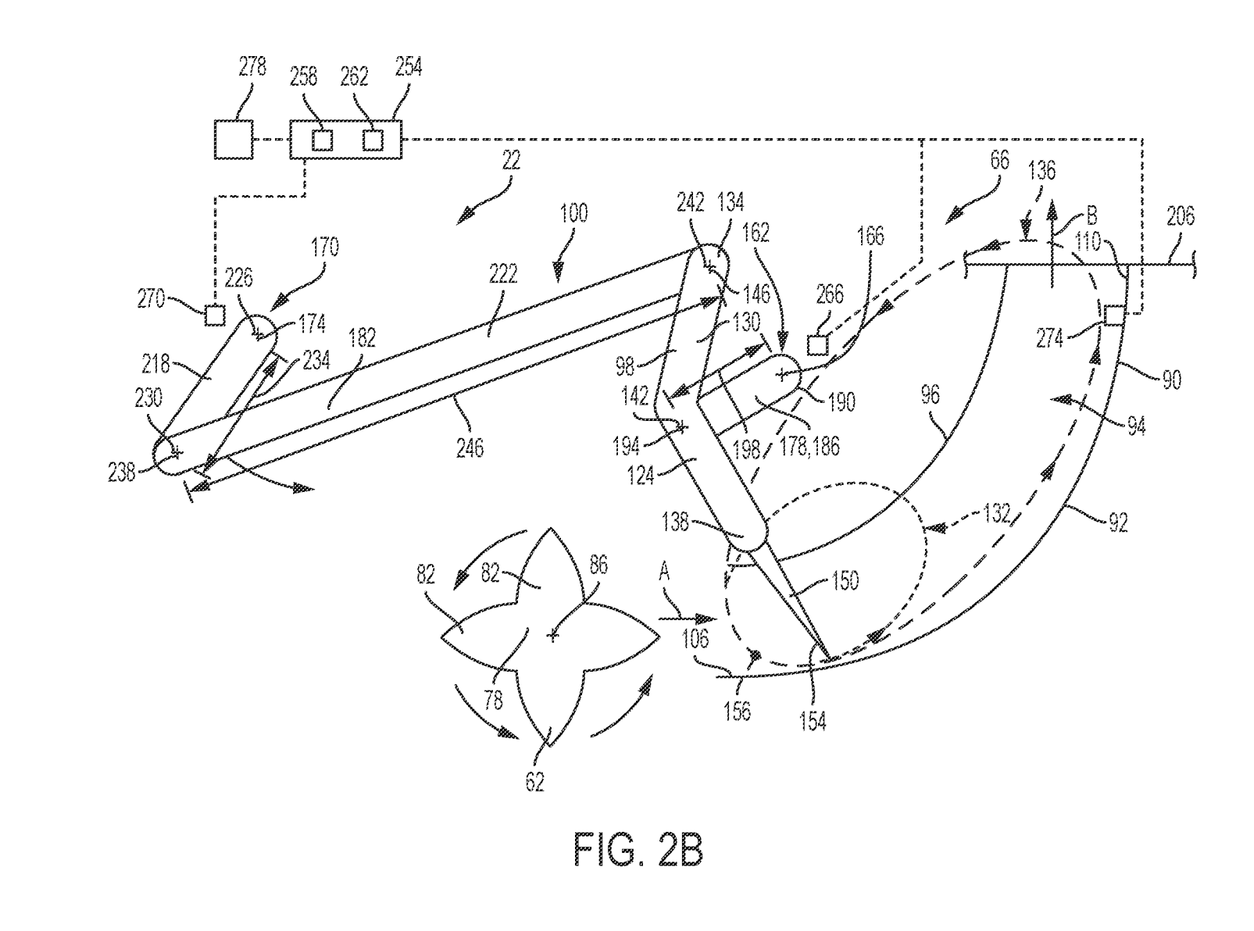
FIG. 2B is a detailed side view of the feed system of FIG. 2A.

As shown in FIGS. 1 and 2A-2B, the feed system 22 of the baler 10 is configured to pick up crop material 46 from a support surface 50 and convey the crop material 46 to the compression system 26 for final densification and bale forming. The feed system 22 includes a pickup assembly 54 defining an inlet 58 for receiving the crop material 46 from the support surface 50 (i.e., a farm field), and a lifter assembly 66 to convey a metered amount of the crop material 46 into the compression system 26.

The pickup assembly 54 of the feed system 22 includes a roller baffle 70 oriented generally transverse to the direction of travel T (e.g., across the width) of the baler 10, and a pickup plate 74 disposed adjacent the roller baffle 70 for conveying the crop 46 towards a cutter assembly 62. The pickup plate 74 may include a continuous loop surface (e.g., a moving conveyor) driven for conveying the crop material 46, or other suitable mechanisms.

In some implementations, the feed system 22 may also include a cutter assembly 62 having an elongated cutter shaft 78 oriented generally transverse to the direction of travel T of the baler 10 and carrying a series of cutters or blades 82 for cutting the crop 46. The cutter assembly 62 rotates about a central axis 86 of the cutter shaft 78 that is oriented generally transverse to the direction of travel T and substantially parallel to the roller baffle 70. During use, the cutter assembly 62 is configured to cut or shorten the length of the crop material 46 before being passed onto the lifter assembly 66. In other implementations, the pickup assembly 54 and cutter assembly 62 may have different constructions and orientations with respect to the baler 10 and with respect to each other.

Illustrated in FIGS. 1, and 2A-2C, the lifter assembly 66 of the feed system 22 includes a feed pan 90 at least partially defining a pre-compression chamber 94 therein, a lifting fork 98 to engage crop material 46 positioned within the pre-compression chamber 94, and a drive assembly 100 to maneuver the lifting fork 98 during the baling operation. During use, the lifter assembly 66 is operable in a "packing mode" of operation, where crop material 46 is packed into the pre-compression chamber 94, and a "filling mode" of operation, where crop material 46 is ejected from the pre-compression chamber 94.

Illustrated in FIGS. 2A and 2B, the feed pan 90 of the lifter assembly 66 is substantially arcuate in shape having a curved bottom wall 92, a top wall 96 spaced a distance from and extending substantially parallel the bottom wall 92, and a pair of side walls 102 extending between the top wall 96 and the bottom wall 92 to at least partially define the pre-compression chamber 94 therebetween. The walls 92, 96, 102 of the feed pan 90 also form a first end or inlet 106 proximate the cutter assembly 62, and a second end or outlet 110 opposite the inlet 106 and proximate the compression chamber 206 of the compression system 26. In the illustrated implementation, the pre-compression chamber 94 extends between the inlet 106 and outlet 110 of the feed pan 90 forming an elongated channel that is open on both ends. During use, crop material 46 enters the pre-compression chamber 94 via the inlet 106, travels along the length of the pre-compression chamber 94, and is ejected via the outlet 110 (i.e., into the compression chamber 206).

In the illustrated implementation, the inlet 106 of the feed pan 90 is oriented at an angle with respect to the outlet 110 such that crop material 46 that enters the pre-compression chamber 94 in a first direction A (i.e., substantially opposite the direction of travel T) is then ejected from the outlet 110 in a second direction B, different than the first direction A. More specifically, the outlet 110 is oriented substantially 90 degrees from the inlet 106. In alternative implementations, the inlet 106 may be substantially parallel to the outlet 110.

The feed pan 90 also includes a plurality of slots 114 defined by the top wall 96 and providing access to the pre-compression chamber 94. The slots 114 are generally elongated in shape and extend along the length of the feed pan 90 between the inlet 106 and the outlet 110. In the illustrated implementation, each slot 114 is sized to allow a corresponding tooth 150 of the lifting fork 98 to pass therethrough.

Figure 2C:
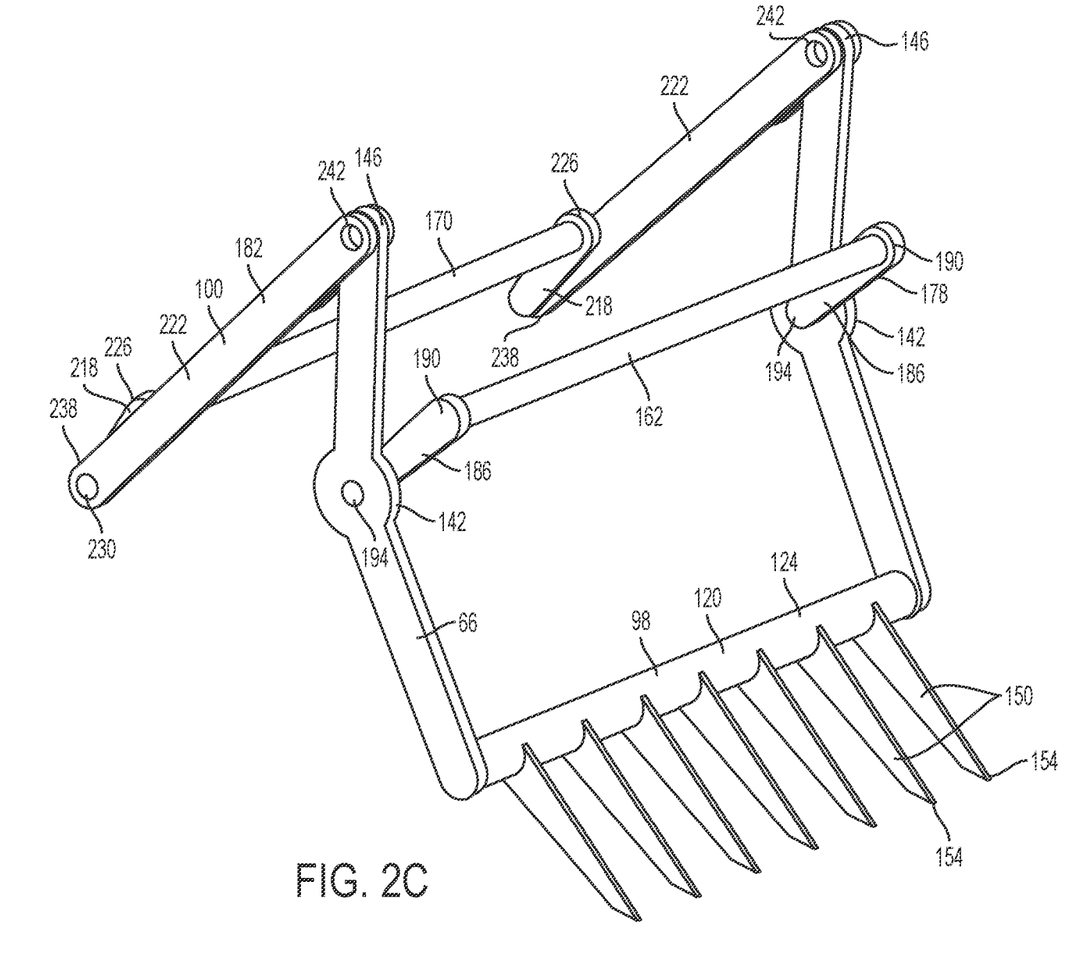
FIG. 2C is a perspective view of the feed system of FIG. 2A with the feed pan removed.

With continued reference to FIGS. 2A-2C, the lifting fork 98 of the lifter assembly 66 includes a body 124 and a plurality of teeth 150 each extending from the body 124 to a distal end 154. The body 124 of the lifting fork 98 includes a pair of side members 130 positioned proximate the side walls 102 of the feed pan 90. The side members 130 of the lifting fork 98 are substantially elongated in shape and include a first end 134, and a second end 138 opposite the first end 134. Each side member 130 also includes a first mounting point 142 positioned proximate the center of the side member 130, and a second mounting point 146 positioned proximate the first end 134 of the side member 130. In the illustrated implementation, each side member 130 forms a slight "V" shape thereby positioning the second end 138 slightly ahead of the first and second mounting points 142, 146. However, in alternative implementations, the side members 130 may be straight or formed as necessary to appropriately position the second end 138 with respect to the first mounting point 142 and the second mounting point 146.

In the illustrated implementation, the body 124 of the lifting fork 98 also includes one or more cross-members 120. More specifically, the body 124 includes a single cross-member 120 oriented substantially transverse to the direction of travel T and coupled to each side member 130 proximate the second end 138 thereof. When assembled, the cross-member 120 acts as a support element providing rigidity and strength to the lifting fork 98 while also acting as a mounting point for the plurality of teeth 150 (described below). While the illustrated implementation includes a single cross-member 120 positioned proximate the second end 138, it is understood that more or fewer cross-members 120 may be included as needed to provide sufficient rigidity to the device.

The teeth 150 of the lifting fork 98 are coupled to and spaced evenly along the width of the cross-member 120. In the illustrated implementation, the teeth 150 are positioned such that each tooth 150 substantially aligns with a corresponding one of the slots 114 of the feed pan 90. As such, when the second end 138 of the lifting fork 98 is maneuvered toward the feed pan 90, the distal ends 154 of each tooth 150 are able to pass through their respective slots 114 and into the pre-compression chamber 94.

During use, the teeth 150 of the lifting fork 98 travel along different lifting paths 132, 136 causing the teeth 150 to selectively engage and manipulate the crop material 46 positioned within the pre-compression chamber 94. Depending upon the contour of the lifting path being followed, the teeth 150 of the lifting fork 98 may affect the behavior of the crop material 46 in different ways. In the illustrated implementation, the teeth 150 are movable along a first lifting path 132, where the teeth 150 draw crop material 46 into the pre-compression chamber 94 through the inlet 106 (generally corresponding to the packing mode of operation), or a second lifting path 136, where the teeth 150 eject crop material 46 out of the pre-compression chamber 94 through the outlet 110 (generally corresponding to the filling mode of operation).

The first lifting path 132 is generally elliptical in shape originating proximate the inlet 106 at an initial point 156.

The first path 132 extends along the curved contour of the bottom wall 92 toward the outlet 110 for approximately half the chamber's length. The first path 132 then exits the pre-compression chamber 94 through the top wall 96 and travels outside the pre-compression chamber 94 toward the inlet 106. The path 132 then re-enters the pre-compression chamber 94 through the top wall 96 and returns to the initial point 156 to complete the circuit. By only traveling along a portion of the length of the pre-compression chamber 94, the teeth 150 of the lifting fork 98 draw crop material 46 into the pre-compression chamber 94 without causing the crop material 46 to exit via the outlet 110. As such, the mass of crop material 46 positioned within the pre-compression chamber 94 increases by a pre-determined amount each time the lifting fork 98 completes a cycle about the first path 132.

The second lifting path 136 is generally elliptical in shape originating proximate the inlet 106 at the same initial point 156 as the first lifting path 132. The second path 136 extends along the curved contour of the bottom wall 92 toward the outlet 110 for approximately the chamber's entire length. The second path 136 then exits the pre-compression chamber 94 proximate the outlet 110 and travels outside the pre-compression chamber 94 back toward the inlet 106. The path 136 then re-enters the pre-compression chamber 94 and returns to the initial point 156 to complete the circuit. By traveling approximately the entire length of the pre-compression chamber 94, the teeth 150 of the lifting fork 98 force crop material 46 positioned within the pre-compression chamber 94 through the outlet 110 and into the compression chamber 206 of the compression system 26. As such, the pre-compression chamber 94 is substantially emptied each time the lifting fork 98 completes a cycle about the second path 136.

Illustrated in FIGS. 2B and 2C, the drive assembly 100 of the lifter assembly 66 includes a first output shaft or rotary drive 162 rotatable about a first axis of rotation 166, and a second output shaft or rotary drive 170 rotatable about a second axis of rotation 174. Each output shaft 162, 170 is actively driven by a power source (e.g., a motor, an engine, the takeoff shaft 42, and the like) and can be controlled independently of one another. The first and second output shafts 162, 170 are in operable communication with the lifting fork 98 such that the relative rotational positions of the two output shafts 162, 170 positively define the location and orientation of the lifting fork 98 with respect to the pre-compression chamber 94. As such, manipulating the rotational position of the first output shaft 162, the second output shaft 170, or a combination thereof forces the lifting fork 98 to move to a predetermined location. In the illustrated implementation, the first axis 166 of the first output shaft 162 is substantially parallel to the second axis 174 of the second output shaft 170 such that both the first and second output shafts 162, 170 are oriented substantially transverse to the direction of travel T of the baler 10. However, in alternative implementations, the relative layout of each output shaft 162, 170 may be modified as necessary.

The drive assembly 100 also includes a gearbox (not shown) configured to receive input from the power takeoff shaft 42 and to selectively convey that power to both the first and second output shafts 162, 170. More specifically, the gearbox includes a number of gear sets (not shown) able to transmit the torque provided by the power takeoff shaft 42 to the first and second output shafts 162, 170 at given gear ratios. In some implementations, the gearbox may have multiple, interchangeable gear sets to permit the gear ratio provided by the gearbox to each output shaft 162, 170 to be changed individually. In other implementations, the gear ratio provided by the gearbox to both output shafts 162, 170 may be interconnected so that the relative gear ratios remain proportionally the same and/or interrelated. In some implementations, the gearbox includes a single housing supporting the first output shaft 162, the second output shaft 170, and the takeoff shaft 42. In other implementations, the various gear sets and other elements of the drive assembly 100 may be positioned in and supported by multiple gearboxes or housings mounted throughout the baler 10 (not shown). For example, a separate gearbox may be included to support each of the first output shaft 162, the second output shaft 170, and the takeoff shaft 42.

The drive assembly 100 also includes a first drive linkage 178 coupled to and extending between the first output shaft 162 and the lifting fork 98. More specifically, the first drive linkage 178 of the drive assembly 100 includes a first crank arm 186 coupled to and extending between both the first output shaft 162 and the first mounting point 142 of the lifting fork 98. The first crank arm 186 of the first drive linkage 178 includes a third mounting point 190, and a fourth mounting point 194 spaced a first crank distance 198 from the third mounting point 190. When assembled, the third mounting point 190 of the first crank arm 186 is fixedly coupled to the first output shaft 162 such that the first crank arm 186 and the first output shaft 162 rotate together as a unit. Furthermore, the fourth mounting point 194 is pivotably coupled to the first mounting point 142 of the lifting fork 98. As such, rotation of the first output shaft 162 about the first axis 166 causes the first mounting point 142 of the lifting fork 98 to travel in a substantially circular path about the first axis 166.

The drive assembly 100 also includes a second drive linkage 182 coupled to and extending between the second output shaft 170 and the lifting fork 98. More specifically, the second drive linkage 182 of the drive assembly 100 includes a second crank arm 218 coupled to the second output shaft 170, and a connecting rod 222 extending between and coupled to both the second crank arm 218 and the lifting fork 98. The second crank arm 218 of the second drive linkage 182 includes a fifth mounting point 226, and a sixth mounting point 230 spaced a second crank distance 234 from the fifth mounting point 226. When assembled, the fifth mounting point 226 of the second crank arm 218 is fixedly coupled to the second output shaft 170 such that the second crank arm 218 and the second output shaft 170 rotate together as a unit. As such, rotation of the second output shaft 170 about the second axis 174 causes the sixth mounting point 230 to travel in a substantially circular path about the second axis 174.

The connecting rod 222 of the second drive linkage 182 includes a seventh mounting point 238, and an eighth mounting point 242 spaced a connecting rod distance 246 from the seventh mounting point 238. When assembled, the seventh mounting point 238 of the connecting rod 222 is pivotably coupled to the sixth mounting point 230 of the second crank arm 218 causing the two points to remain coincident. Similarly, the eighth mounting point 242 is pivotably coupled to the second mounting point 146 of the lifting fork 98 causing those two points to remain coincident. As such, any rotational movement of the second output shaft 170 is transmitted to second mounting point 146 of the lifting fork 98 via the second drive linkage 182.

The drive assembly 100 also includes a first clutch 250, in operable communication with the second output shaft 170. During use, the clutch 250 is adjustable between an engaged configuration, in which torque from the gearbox and the second output shaft 170 are in operable communication causing the second output shaft 170 to rotate about the first axis 166, and a disengaged configuration, in which the gearbox and the second output shaft 170 are not in operable communication and the second output shaft 170 remains stationary. Although not illustrated, the drive assembly 100 may also include a corresponding brake (not shown) to maintain the second output shaft 170 in its stationary position when the clutch 250 is disengaged, eliminating the ability of the second output shaft 170 to rotate freely on its own. While the illustrated implementation includes a single clutch 250 associated with the second output shaft 170, the drive assembly 100 may also include a second clutch (not shown) in operable communication with the first output shaft 162.

During use, the first and second output shafts 162, 170 may rotate with respect to one another in a plurality of unique "output patterns" causing the teeth 150 of the lifting fork 98 to reciprocate along a series of unique, generally elliptical-shaped paths. More specifically, referring to FIG. 3A, the drive assembly 100 is operable in a first output pattern 210, where the teeth 150 travel along the first lift path 132 (described above), and a second output pattern 214, where the teeth 150 travel along the second lift path 136 (described above). As such, the output shafts 162, 170 can transition between the first and second output patterns 210, 214, causing the drive assembly 100 to transition between the packing and filling modes of operation.

When operating in the first output pattern 210, the clutch 250 is in the disengaged configuration causing power to only be transmitted to the first output shaft 162. As such, the first output shaft 162 rotates about the first axis 166 at a constant, non-zero rotational speed and the second output shaft 170 remains stationary (e.g., does not rotate about the second axis 174; see FIG. 3A). As a result, the relative movement of the output shafts 162, 170 in combination with the layout of the first and second drive linkages 178, 182 causes the lifting fork 98 to move along the first lifting path 132.

Figure 3A:
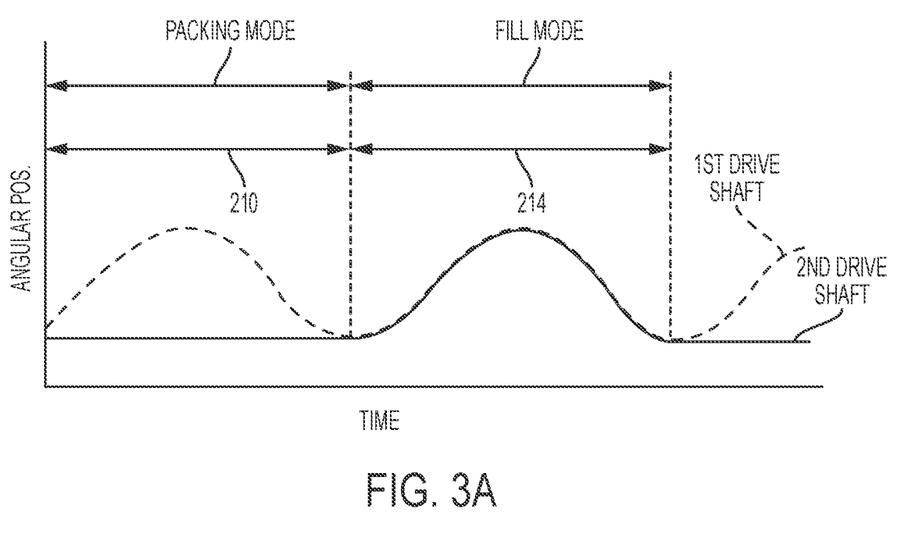
FIGS. 3A-C illustrate the rotational movement of the first rotary drive and of the second rotary drive during the baling process.

In the illustrated implementation, the second output shaft 170 remains in a common location (e.g., with the first crank arm 186 in the six o'clock position) causing the contour of the first lifting path 132 to remain similar for each subsequent cycle. However, in alternative implementations, the second output shaft 170 may be moved or re-located to different "rest" locations (e.g., with the first crank arm 186 in the six o'clock position for one cycle, then in the nine o'clock position for a subsequent cycle, and the like) in order to allow the user to finely tune or adjust the contour of the first lifting path 132.

When operating in the second output pattern 214, the clutch 250 is in the engaged configuration causing power to be transmitted to both the first and second output shafts 162, 170. As such, both the first and second output shafts 162, 170 rotate at a constant, non-zero rotational speed about their respective axes 166, 174. As a result, the relative movement of the output shafts 162, 170 in combination with the layout of the first and second drive linkages 178, 182 causes the lifting fork 98 to move along the second lifting path 136. In the illustrated implementation, both the first and second output shafts 162, 170 rotate in the same direction and at generally the same speed when operating in the second output pattern 214 (see FIG. 3A). However, in alternative implementations, the relative speed of the first and second output shafts 162, 170 may be adjustable with respect to one another during use through an adjustable gearbox (not shown) or limited slip clutch (not shown). In such implementations, the variation in speed may be used to finely tune or adjust the contour of the second output pattern 214.

Figure 3B:
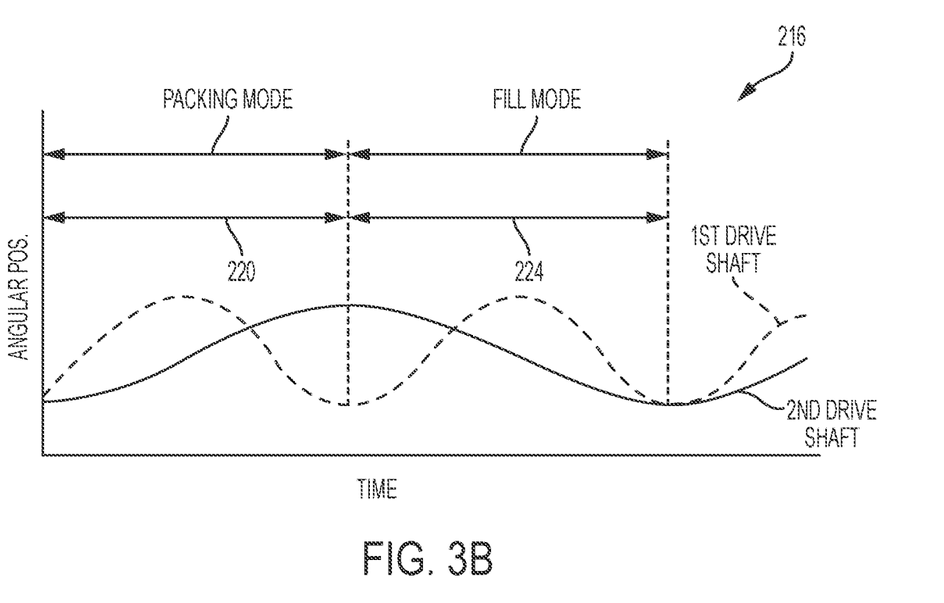

The first and second output shafts 162, 170 are also operable in a third output pattern 216. When operating in the third output pattern 210, both output shafts 162, 170 receive power causing the first and second output shafts 162, 170 to rotate about their respective axes of rotation 166, 174. However, the gearbox is configured such that the two output shafts 162, 170 rotate at different constant, non-zero rotational speeds. More specifically, the second output shaft 170 rotates at half the rate of the first output shaft 162 (see FIG. 3B). As a result, the relative movement of the output shafts 162, 170 in combination with the arrangement of the first and second drive linkages 178, 182, produce two zones of operation. The first zone 220 causes the lifting fork 98 to move along the first lifting path 132 (e.g., in the packing mode of operation), while the second zone 224 causes the lifting fork 98 to move along the second lifting path 136 (e.g., in the filling mode of operation). As such, the third output pattern 216 is able to produce both the first and second lifting paths 132, 136 without the need for engaging and disengaging any clutches 250. When operating in the third output pattern 216, the relative speed of the first output shaft 162 and the second output shaft 170 is generally some harmonic of the other (e.g., 2:1, 3:1, 4:1, etc.) so that the two shafts can return to an initial starting position.

Figure 3C:
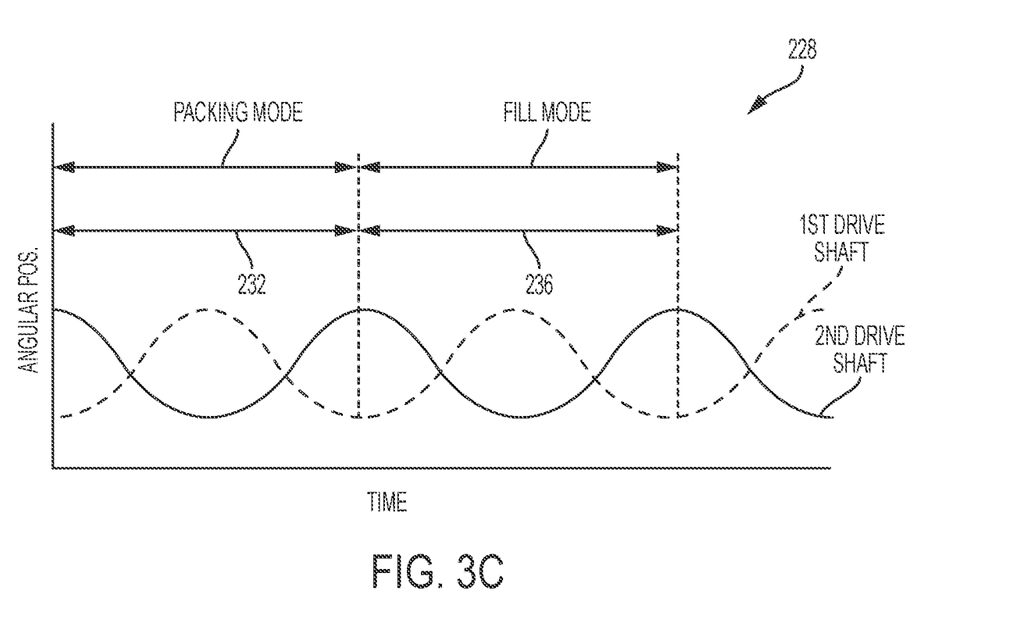

The first and second output shafts 162, 170 are also operable in a fourth output pattern 228. When operating in the fourth output pattern 228, both output shafts 162, 170 receive power causing the first and second output shafts 162, 170 rotate about their respective axes of rotation 166, 174. However, the gearbox is configured such that the two output shafts 162, 170 rotate in different directions (see FIG. 3C). As a result, the relative movement of the output shafts 162, 170 in combination with the arrangement of the first and second drive linkages 178, 182, produce two zones of operation. The first zone 232 causes the lifting fork 98 to move along the first lifting path 132 (e.g., the packing mode of operation), while the second zone 236 causes the lifting fork 98 to move along the second lifting path 136 (e.g., the filling mode of operation). As such, the fourth output pattern 228, like the first output pattern 216, is able to produce both the first and second lifting paths 132, 136 without the need for engaging and disengaging any clutches 250.

Illustrated in FIG. 2B, the baler 10 also includes a controller 254 to monitor and direct the baling process. The controller 254 includes a processor 258, a memory unit 262 in operable communication with the processor 258, one or more sensors 266, 270, and 274 sending and receiving signals from the processor 258, and a user input 278 in operable communication with the processor 258. The processor 258 is also in operable communication with various elements of the drive assembly 100 including, but not limited to, the clutch 250. During use, the processor 258 receives signals from the one or more sensors 266, 270, 274, and combines that information with one or more predetermined control algorithms and outputs signals to control the motion of the lifting fork 98 with respect to the pre-compression chamber 94.

In particular, the baler 10 includes a first crank arm position sensor 266, a second crank arm position sensor 270, and a pre-compression chamber fill sensor 274. The sensors 266, 270, 274 may be present individually, in plurality, or in combination. Although not illustrated, the controller 254 may also include additional sensors such as, but not limited to, a plunger position sensor (e.g., for the compression system 26). While the sensors of the illustrated implementation are electronic in nature, it is to be understood that in alternative implementations the controller 254 and sensors may be mechanical in nature.

The first crank arm position sensor 266 includes a sensor mounted to the first crank arm 186 and configured to measure the relative position of the first crank arm with respect to the frame 14 of the baler 10 (e.g., a first crank position angle). The first crank arm position sensor 266 may include a sensor mounted directly to the first crank arm 186, or a sensor mounted on the first output shaft 162. Such sensors may include Hall Effect sensors, variable resistance sensors, optical sensors, and the like.

The second crank arm position sensor 270 includes a position sensor mounted to the second crank arm 218 and configured to measure the relative position of the second crank arm with respect to the frame 14 of the baler 10 (e.g., the second crank position angle). The second crank arm position sensor 270 may include a sensor mounted directly to the first crank arm 218, or a sensor mounted on the first output shaft 164. Such sensors may include Hall Effect sensors, variable resistance sensors, optical sensors, and the like.

The pre-compression chamber fill sensor 274 is configured to measure when a sufficient mass of crop material 46 is positioned within the pre-compression chamber 94 of the feed pan 90. The pre-compression chamber fill sensor 274 may include a micro-switch or infrared eye that is triggered when the crop material level reaches a particular location in the pre-compression chamber 94. In still other implementations, the chamber fill sensor 274 may include a number of mechanical arms or gates that are in mechanical communication with the clutch 250.

During operation, the processor 258 of the baler 10 monitors the motion of the first and second output shafts 162, 170 and the fill sensor 274 and outputs signals to the clutch 250 to alternate the lifter assembly 66 between a "packing mode" of operation and a "filling mode" of operation. More specifically, the processor 258 begins with the drive assembly 100 in "packing mode" of operation, whereby the clutch 250 is disengaged causing the drive assembly 100 to produce the first output pattern 210 and the teeth 150 to move along the first lifting path 132. Once the processor 258 receives a signal from the fill sensor 274 indicating the pre-compression chamber 94 is full, the processor 258 changes the lifter assembly 66 to the "filling mode" of operation by outputting a signal to the clutch 250 causing it to change from the disengaged configuration to the engaged configuration. By doing so, the drive assembly 100 begins producing the second output pattern 214 and the teeth 150 travel along the second lifting path 136.

After a single rotation about the second path 136 by the teeth 150 to evacuate the pre-compression chamber 94, the processor 258 sends another signal to the clutch 250 causing it to switch back to the disengaged configuration. By doing so, the drive assembly 100 returns to producing the first output pattern 210 and the teeth 150 travel along the first lifting path 132.

When changing between the first and second output patterns 210, 214, the processor 258 takes into account the position of the lifting fork 98 and the position of the plunger (not shown) within the compression chamber 126 to properly time the sending of signals to the clutch 250. For example, switching between the second output pattern 214 and the first output pattern 210 occurs when the distal ends 154 of the teeth 150 are positioned proximate the initial point 156 (e.g., where both the first path 132 and the second path 136 are coincident). The processor 258 must also verify that the compression chamber is not obstructed by the plunger as the teeth 150 move through the second lifting path 136.

During operation, the baler 10 begins with no crop material 46 in the pre-compression chamber 94 and the lifting assembly 66 in the "packing mode" of operation (described above). As such, the clutch 250 is disengaged causing the drive assembly 100 to produce the first output pattern 210 and the teeth 150 to travel along the first lifting path 132.

As the baler 10 operates, the forward motion of the baler 10 in the direction of travel T causes crop material 46 positioned on the support surface 50 to come into contact with and be collected by the pickup assembly 54. The collected crop material 46 is then processed by the cutter assembly 62 and directed toward the inlet 106 of the pre-compression chamber 94. The lifting fork 98 then engages the crop material 46 exiting the cutter assembly 62 and directs a portion of the crop material 46 into the pre-compression chamber 94 with each passing stroke. As the lifting fork 98 continues to cycle along the first path 132, the lifting fork 98 continues to direct portions of crop material 46 into the pre-compression chamber 94 causing the mass of crop material 46 positioned in the pre-compression chamber 94 to increase.

Once the mass of crop material 46 positioned within the pre-compression chamber 94 reaches a predetermined level, the chamber fill sensor 274 sends a signal to the controller 254 indicating the pre-compression chamber is full. The controller 254 receives this signal while continuously monitoring the rotational positions of the first and second output shafts 162, 170 and the plunger of the compression system 26.

With the signal from the chamber fill sensor 274 received, the controller 254 changes the lifter assembly 66 from the packing mode of operation to the filling mode of operation. To do so, the controller 254 calculates, via both crank arm position sensors 266, 270, the location of the distal end 154 of the tooth 150. Once the distal end 154 of the tooth 150 is positioned proximate the initial point 156, the controller 254 sends a signal to the clutch 250 causing it to change from the disengaged configuration to the engaged configuration. As described above, doing so causes torque from the power takeoff shaft 42 to be conveyed to both output shafts 162, 170. As a result, the drive assembly 100 produces the second output pattern 214 and the teeth 150 travel along the second lifting path 136.

With the output pattern changed, the subsequent cycle of the lifting fork 98 follows the second path 136 instead of the first path 132. As such, the lifting fork 98 engages the crop material 46 positioned within the pre-compression chamber 94 and ejects the crop material 46 through the outlet 110 and into the compression chamber 126 of the compression system 26.

After the traveling along the second path 136, the lifting fork 98 returns to the initial point 156 whereby the processor 258 sends a signal to the clutch 250 causing it to return to the disengaged configuration. By doing so, the drive assembly 100 produces the first output pattern 210, the teeth 150 travel along the first lifting path 132, and the process begins anew.

The invention claimed is:
1. A baler comprising:
   a frame;
   a compression system coupled to the frame, the compression system at least partially defining a compression chamber;

a feed pan at least partially defining a pre-compression chamber, wherein the pre-compression chamber is in operable communication with the compression chamber;

a lifting fork movable with respect to the pre-compression chamber, wherein the lifting fork includes a first end and a second end configured to engage crop material;

a first driven output shaft rotatable about a first axis of rotation;

a first crank arm attached to the first driven output shaft and extending to a first mounting point spaced a first crank distance from the first axis of rotation, and wherein the first mounting point is pivotably coupled to the lifting fork between the first end and the second end of the lifting fork;

a second driven output shaft rotatable about a second axis of rotation;

a second crank arm attached to the second driven output shaft and extending to a second mounting point spaced a second crank distance from the second axis of rotation;

a connecting rod pivotably attached to and extending directly between the second mounting point of the second crank arm and the first end of the lifting fork; and a controller in operable communication with the first driven output shaft and the second driven output shaft, wherein the controller is configured to operate in a first mode of operation in which the first driven output shaft is configured to rotate about the first axis of rotation and the second driven output shaft is configured to concurrently not rotate about the second axis of rotation, and a second mode of operation in which the first driven output shaft is configured to rotate about the first axis of rotation and the second driven output shaft is configured to concurrently rotate about the second axis of rotation.

2. The baler of claim 1, further comprising a fill sensor configured to detect when the pre-compression chamber is full of crop material.

3. The baler of claim 2, wherein the controller is configured to switch between the first and second modes of operation based at least in part on a signal from the fill sensor.

4. The baler of claim 1, further comprising a power source, and wherein at least one of the first driven output shaft and the second driven output shaft are in operable communication with the power source via a clutch.

5. The baler of claim 1, wherein the lifting fork is movable along a first lifting path and along a second lifting path different than the first lifting path.

6. The baler of claim 5, wherein the first lifting path is configured to correspond with a packing mode of operation.

7. The baler of claim 6, wherein the second lifting path is configured to correspond with a filling mode of operation.

8. The baler of claim 5, wherein when the first driven output shaft rotates about the first axis and the second lifting fork concurrently rotates about the second axis, the first and second driven output shafts rotate in the same direction.

9. The baler of claim 5, wherein when the first driven output shaft rotates about the first axis and the second driven output shaft concurrently rotates about the second axis, the first and second output shafts rotate at the same speed.

* * * * *